United States Patent [19]

Ishigami et al.

[11] Patent Number: 4,932,283
[45] Date of Patent: Jun. 12, 1990

[54] LOCKING APPARATUS FOR SHIFT LEVER

[75] Inventors: Narumi Ishigami; Syuzi Nakamura; Shigetoshi Miyoshi; Isao Ichihara, all of Aichi, Japan

[73] Assignees: Kabushiki Kaisha Tokai-Rika-Denki-Seisakusho, Niwa; Toyota Jidosha Kabushiki Kaisha, Aichi, both of Japan

[21] Appl. No.: 265,444

[22] Filed: Nov. 1, 1988

[30] Foreign Application Priority Data

Nov. 4, 1987 [JP] Japan .................... 62-168896
Dec. 11, 1987 [JP] Japan .................... 62-189169

[51] Int. Cl.⁵ .................................. G05G 9/12
[52] U.S. Cl. .............................. 74/477; 74/850
[58] Field of Search ........... 74/477, 475, 850, 878; 70/237, 238, 247, 248

[56] References Cited

U.S. PATENT DOCUMENTS

| | | |
|---|---|---|
| 2,875,640 | 3/1956 | Huso . |
| 3,859,828 | 1/1975 | Ibuka et al. . |
| 3,942,614 | 3/1976 | Thompson . |
| 4,096,930 | 6/1978 | Viscardi . |
| 4,249,404 | 2/1981 | Kimberlin ............ 74/477 X |
| 4,473,141 | 9/1984 | Mochida . |
| 4,474,085 | 10/1984 | DeVogelaere et al. . |
| 4,520,640 | 6/1985 | Kramer . |
| 4,671,085 | 6/1987 | Yamaguchi et al. . |
| 4,724,722 | 2/1988 | Beauch et al. . |

FOREIGN PATENT DOCUMENTS

| | | |
|---|---|---|
| 53-45573 | 1/1975 | Japan . |
| 50-54733 | 5/1975 | Japan . |
| 56-19451 | 2/1981 | Japan . |
| 57-42424 | 3/1982 | Japan . |
| 57-148222 | 9/1982 | Japan . |
| 57-163427 | 10/1982 | Japan . |
| 59-137234 | 8/1984 | Japan . |
| 59-176253 | 11/1984 | Japan . |
| 60-20448 | 2/1985 | Japan . |
| 60-23427 | 2/1985 | Japan . |
| 60-135352 | 7/1985 | Japan . |
| 61-143825 | 7/1986 | Japan . |
| 62-20343 | 5/1987 | Japan . |
| 62-247943 | 4/1988 | Japan . |

OTHER PUBLICATIONS

European Search Report on European Patent Application No. EP 88 11 8327.
U.S. patent application Ser. No. 243,759 filed Sep. 13, 1988 to Imai et al.

Primary Examiner—Laurie K. Cranmer
Attorney, Agent, or Firm—Finnegan, Henderson, Farabow, Garrett and Dunner

[57] ABSTRACT

A locking apparatus for a shift lever provided for operating an automatic transmission, where if the shift lever is not located in a non-driving position such as a "P" range, a key rotor cannot be rotated to a lock position and, if the key rotor is not rotated from the lock position to an operating position, the shift lever cannot be moved from the non-driving position. An extension is interlocked with a detent pin which serves to hold the shift lever in the non-driving position. The extension is arranged to move along the axis of the key rotor in interlocked relationship with the movement of the detent pin and to move into and away from the locus of movement of a lock portion which is rotated together with the key rotor. When the extension is moved into the locus, the extension inhibits both the movement of the key rotor to the lock position and the shifting of the shift lever from the non-driving position to another position.

20 Claims, 11 Drawing Sheets

LOCKING APPARATUS FOR SHIFT LEVER

BACKGROUND OF THE INVENTION

1. Field of the Invention

The present invention relates to a locking apparatus for a shift lever in a vehicle and, more particularly, to a locking apparatus for a shift lever interlocked with a key rotor which is rotated by means of an ignition key.

2. Description of the Related Art

In general, when an occupant parks and leaves a vehicle provided with an automatic transmission, a shift lever is shifted to a "P" position, an ignition key is used to rotate a key rotor of a key cylinder to a "LOCK" position which serves as a lock position where all the operations are locked, and the key is pulled out of the key rotor. When starting the vehicle, the key is inserted into the key rotor while keeping the shift lever in the "P" position, the key rotor is rotated from the "LOCK" position to a "START" position through "ACC" and "ON" positions by means of the key to start the engine, and the shift lever is shifted to a driving position such as a "D" position or an "R" position, thereby the vehicle runs. Such a conventional type of vehicle is usually arranged such that, even when no key is inserted into the key rotor, or even when the key rotor is located in the "LOCK" position, the shift lever can be shifted from the "P" position to another position, as well as such that even when the shift lever is located in any one of the positions other than the "P" position, the key can be rotated to the "LOCK" position and pulled out of the key rotor.

Accordingly, a shift-lever locking apparatus has been proposed to provide that key operation is carried out simultaneously with shift-lever operation.

For instance, U.S. Pat. No. 4,671,085, Japanese Patent Application Laid-open Ser. Nos. 135352/1985 and 137234/1984 disclose respectively a shift lever apparatus in which a cam member coupled to a cylinder lock causes a latch member to move in a radial direction of the cam member and the latch member controls movement of a projecting piece fixed to one end of a remote control cable. When the cylinder lock is moved to a LOCK position by key operation, movement of the remote control cable is restricted and a bell crank fixed to the other end of the cable inhibits the shift lever from shifting from a PARKING position to another position.

However, since the remote control cable is engaged with the cam member by means of the projecting piece and the latch member, the above-described shift lever apparatus causes problems that a large number of parts or members are required and that the engagement between the latch member and the projecting piece tends to be imperfect.

U.S. Pat. No. 4,724,722 discloses a shift lever apparatus in which a shift lever and a key are relatedly moved by means of a control cable. The relationship between a key cylinder lock and a control wire is such that a latch pin which is moved in the radial direction of a key cylinder by a key operation is fixed to one end of a control cable so as to control movement of a slide member which is adapted to linearly move.

For this reason, this apparatus still causes problems that a large number of parts or members are required in a coupling structure between the control cable and the key cylinder lock and that an excessive load tends to occur in the latch pin for inhibiting a slider from linearly moving.

SUMMARY OF THE INVENTION

It is, therefore, an object of the present invention to provide a locking apparatus for a shift lever in a vehicle, in which it is possible to reduce a number of parts required in a coupling portion between a control wire and a key lock cylinder, and to be smoothly operated.

To achieve the above and other objects, in accordance with the present invention, there is provided a locking apparatus for a shift lever provided for operating an automatic transmission of a vehicle. The locking apparatus is arranged to allow the shift lever to be operated under particular conditions, and comprises: (a) a key rotor arranged to be rotated with a key operation by an occupant between a lock position and an operating position which allows the vehicle to be running; (b) a shift lever arranged to be shifted by the occupant between a driving position which places the automatic transmission in the vehicle driving state and a non-driving position which places the vehicle in the non-driving state; (c) detent means disposed on the shift lever for movement between an inhibiting position and a releasing position, when the shift lever is shifted from the driving position to the non-driving position, the detent means is moved to the inhibiting position to inhibit the shift lever from shifting from the non-driving position to the driving position, and when the detent means is moved from the inhibiting position to the releasing position under the operation by the occupant, the detent means permits the shift lever to shift to the driving position; (d) a lock member arranged to be rotatable coaxially with the key rotor and to be relatedly movable with a rotary operation of the key rotor; and (e) interlocking means disposed between a detent pin of the shift lever and the lock member and an end of the interlocking means located adjacent to the lock member moves in the direction parallel to an axis of the key rotor, when the shift lever is positioned in the driving position, so that the interlocking means is placed in a first state in which the aforesaid one end projects into a locus of movement of the lock member, thereby inhibiting the key rotor from rotating to the lock position and, on the other hand, the interlocking means is placed in a second state that in which the aforesaid one end is prevented from projecting into the locus of movement of the lock member when the key rotor is turned, and the detent means is held in the inhibiting position at the non-driving position of the shift lever, and maintains a state in which it is impossible to move the shift lever to the driving position until the key rotor is moved to the operating position; whereby the shift lever is held in the non-driving position of the lock position of a key, whereby switching of the key to the lock position is inhibited at the driving position of the shift lever.

In accordance with the present invention, since the interlocking means is brought into direct contact with the lock member, the number of parts can be decreased. Further, since the lock member or the lock lever provided at one end of the lock member moves in the axial direction of the key rotor, and the radial size of the apparatus in the vicinity of the key rotor does not increase in the amount of projection into the vehicle interior is reduced and smooth operation can be achieved.

DESCRIPTION OF THE PREFERRED EMBODIMENTS

Preferred embodiments of the present invention will be described below with reference to the accompanying drawings.

Figure 2:
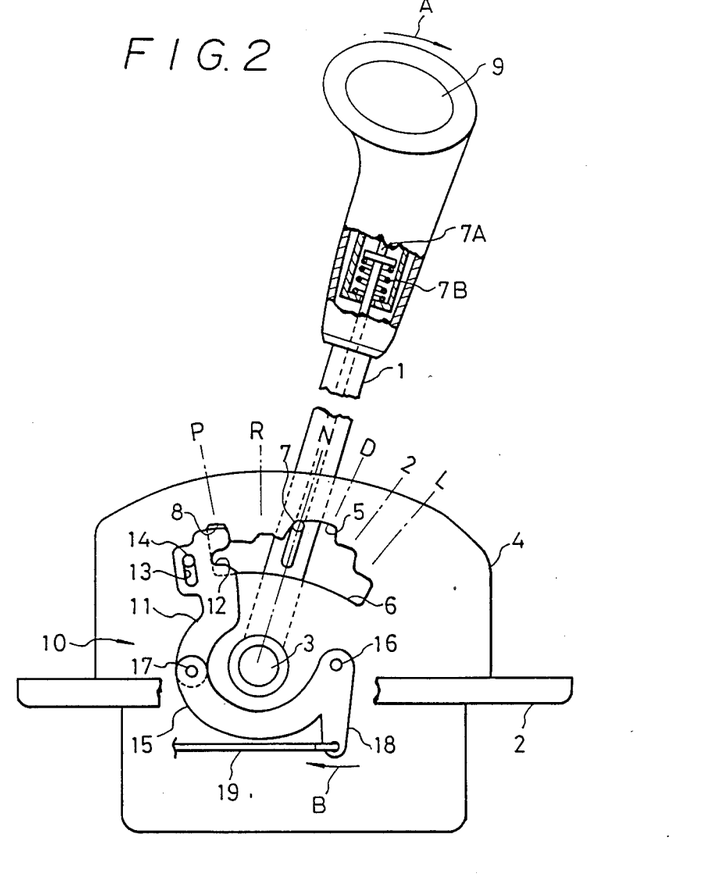
FIG. 2 is a side elevational view of a shift lever according to a first embodiment.

Referring to FIG. 2, a shift lever 1 is supported by a shaft 3 mounted in a frame 2, and can be rotated, both in the direction indicated by an arrow head A and in the direction opposite thereto, about the shaft 3 which serves as a fulcrum. A detent plate 4 is fixed to the frame 2, and an engagement aperture 6 is formed in the detent plate 4. The engagement aperture 6 has a restricting portion 5 which is formed in a stepwise manner in the direction of rotation of the shift lever 1. The engagement aperture 6 cooperates with a detent pin 7 which is described later to control the rotation of the shift lever 1 when the shift lever 1 is to be shifted to any one of a "P (parking)" position, an "R (reverse)" position, an "N (neutral)" position, a "D (drive)" position, a "2 (second)" position and an "L (low)" position. A portion of the engagement aperture 6 has a lock recess 8 at a location corresponding to the "P" position which serves as a particular non-driving position. A detent shaft 7A is disposed in the shift lever 1 for movement along the axis of the shift lever 1, and the detent pin 7 is attached to the distal end portion of the detent shaft 7A in such a manner as to project in a direction perpendicular to the axis of the detent shaft 7A, that is out from the sheet of FIG. 2. The detent shaft 7A is urged toward a pushbutton 9 by the urging force of a compression coil spring 7B. Accordingly, when the pushbutton 9 provided on the top of the shift lever 1 is depressed, the detent shaft 7A is caused to travel downwardly in FIG. 2 and thus the detent pin 7 is disengaged from the restricting section 5 of the shift-lever position at which the detent pin 7 has been engaged. When the depression of the pushbutton 9 is released, the detent shaft 7A is caused to travel upwardly by the urging force of the compression coil spring 7B and thus the detent pin 7 engages with an engagement surface which corresponds to any of the six shift-lever positions provided in the restricting portion 5. In this state, the detent pin 7 cooperates with the detent plate 4 to restrict the rotary operation of the shift lever 1.

A shift-lever locking apparatus 10 will be described below. An engagement recess 12 whose opening faces to the right in FIG. 2 is formed in an upper portion of the movable member 11 which constitutes a part of the locking apparatus 10. A slot 13 is formed in an upper left hand portion of the movable member 11, and a pin 14 which is disposed in an upright manner on the detent plate 4 in the vicinity of the lock recess 8 is inserted in the slot 13. The movable member 11 is arranged such that the relative movement between the slot 13 and the pin 14 causes the engagement recess 12 to move along the line which connects the axis of the shaft 3 and the lock recess 8. One end of a lever 15 is pivotally coupled to the lower end of the movable member 11 by means of a shaft 17. An intermediate portion of the lever 15 is rotatably supported on the detent plate 4 by means of a shaft 16, and an arm 18 integral with the lever 15 extends therefrom. One end of a control wire 19 which serves as a coupling member is connected to the extending end of the arm 18, and the other end of the control wire 19 is connected to a lock lever 27 which will be described later.

Figure 3:
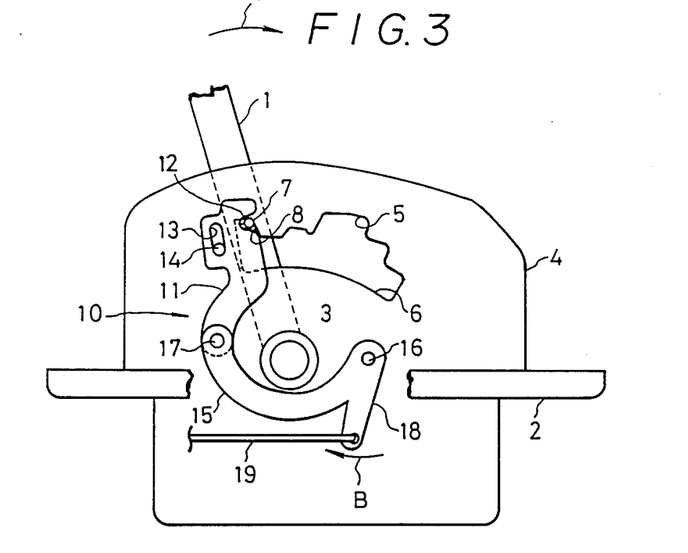
FIG. 3 is a side elevational view showing an operation of the shift lever shown in FIG. 2.

When the shift lever 1 is, as shown in FIG. 2, located in any one of the positions other than the "P" position, the shift-lever locking apparatus 10 is unlocked. Accordingly, in this state, when the shift lever 1 is operated in the direction opposite to the arrow head A and shifted to the "P" position while the pushbutton 9 is being depressed, the detent pin 7 engages with the engagement recess 12 formed in the movable member 11. When the depression of the pushbutton 9 is released, the detent pin 7 together with the movable member 11 is moved upwardly as shown in FIG. 3 by the urging force of the compression coil spring 7B which acts upon the detent pin 7, and thus the detent pin 7 engages with the lock recess 8. Simultaneously, the arm 18 of the lever member 15 is rotated about the shaft 16 in the direction indicated by an arrow head B and the shift lever locking apparatus 10 is placed in a locked state.

Figure 1:
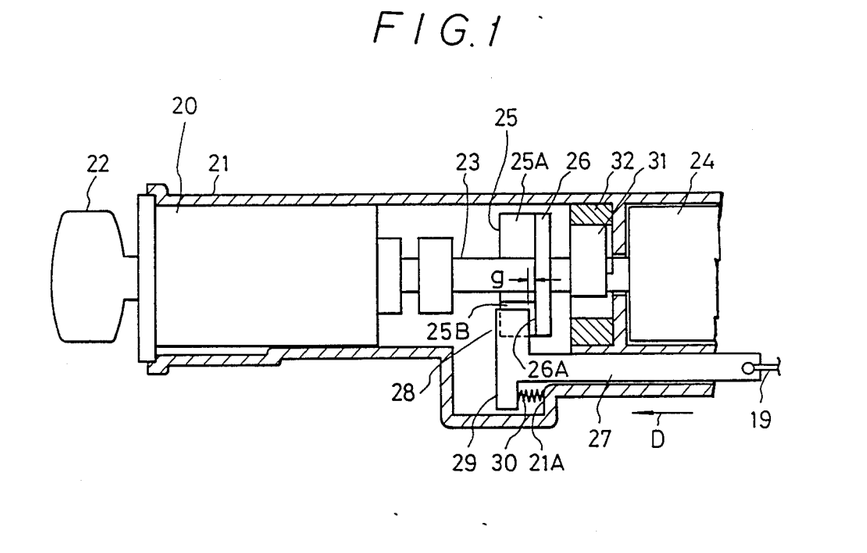
FIG. 1 is a cross-sectional view of an ignition key apparatus to which the present invention is applied.
Figure 4:
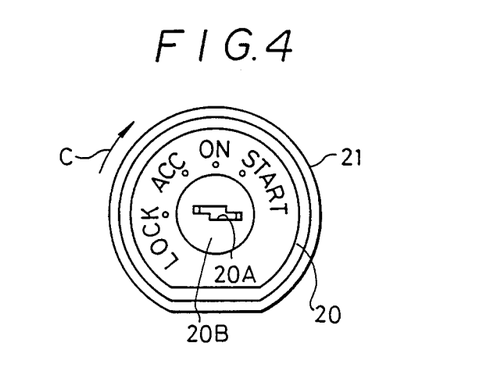
FIG. 4 is a front view of a key rotor, taken along the axis thereof, according to the first embodiment.

Referring to FIG. 1, a key cylinder 20 is accommodated in a housing 21 which is fixed to a steering column (not shown). As shown in FIG. 4, a key rotor 20B having a key hole 20A on its axis is rotatably incorporated in the key cylinder 20. When the key rotor 20B is switched to a "LOCK" position which serves as a lock position, a key 22 can be inserted into and pulled out of the key hole 20A. When the inserted key 22 is rotated in the direction indicated by an arrow head C, the key rotor 20B can be shifted to a desired one of operating positions "ACC", "ON" and "START" and, at the desired operating position, the key 22 cannot be pulled out. One end of a shaft 23 which rotates integrally with the key rotor 20B is coaxially connected to the rear end of the key rotor 20B. The other end of the shaft 23 is coupled to an ignition switch 24. As shown in FIG. 1 as well as FIG. 5, a lock portion 25 having an approximately semicircular shape in cross section is disposed on the outer periphery of an intermediate portion of the shaft 23. The lock portion 25 has an end surface 25A which extends in the radial direction of the shaft 23, and a flange portion 26 of approximately semicircular shape which extends from the edge portion of the end surface 25A opposite to the key cylinder 20. As viewed in the direction of the axis of the shaft 23, the flange portion 26 and the lock portion 25 constitute a circle. A cutaway step 25B is formed in the portion of the end surface 25A which is nearer to the outer periphery of the lock portion 25, and the cutaway step 25B serves to receive the lateral extension 28 of a lock bar 27. The other end of the lock wire 19 is connected to one end of the lock bar 27. The lock bar 27 is supported in the housing 21 for movement in parallel with the shaft 23 both in the direction indicated by an arrow head D and in the direction opposite to the arrow head D and the lateral extension 28 is fixed to the other end of the lock bar 27 at right angles to the axis thereof. A receiving extension 29 projects from the other end of the lock bar 27 in the direction opposite to and substantially in line with the lateral extension 28. A compression coil spring 30 is disposed between the receiving extension 29 and a receiving portion 21A formed on the housing 21. The lock lever 27 is urged in the direction of the arrow head D by the compression coil spring 30

As shown in FIG. 1, a cam 31 projects from the outer periphery of the rear end of the shaft 23. A lock bar (not shown) is connected to a frame 32 which is moved by the cam 31, and when the key rotor 20B is rotated to the "LOCK" position, one end of the lock bar is brought into engagement with the steering shaft and thus the steering shaft is locked.

Figure 5:
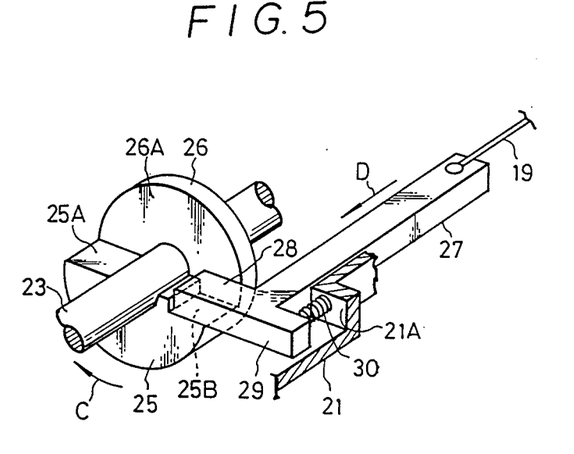
FIG. 5 is a perspective view showing a relationship between a lock lever and a lock portion in the first embodiment.
Figure 6:
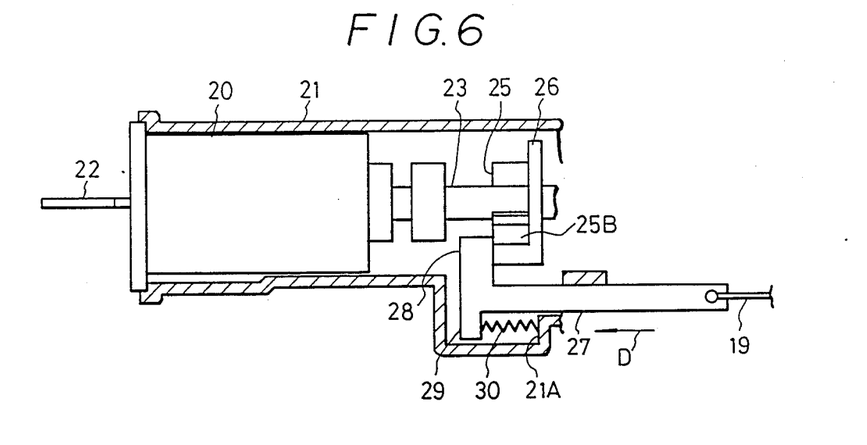
FIG. 6 is a cross-sectional view showing an operation of the ignition key apparatus shown in FIG. 1.
Figure 7:
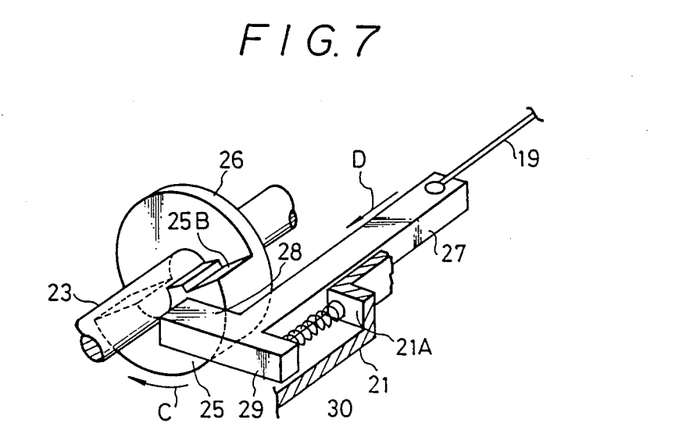
FIG. 7 is a perspective view showing an operation of the lock lock lever and the lock portion shown in FIG. 5.

FIGS. 1 and 5 show the state wherein the key rotor 20B is located in the "ACC" position, the shift-lever locking apparatus 10 is unlocked, and the lock lever 27 is located in a first position in which it is pulled in the direction opposite to the arrow head D by means of the control wire 19. In this state, the lateral extension 28 of the lock lever 27 engages with the step 25B of the lock portion 25 and is, therefore, located in the locus of rotation of the lock portion 25. Thus, the lateral extension 28 inhibits the rotation of the lock portion 25 and hence the rotation of the key rotor 20B in the direction opposite to the arrow head C. Furthermore, in this state, the right-hand surface of the lateral extension 28, as shown in FIG. 1, is opposed to a left-hand surface 26A of the flange portion 26 with a predetermined gap "g" formed therebetween. As shown in FIG. 3, when, in this state, the shift lever 1 is shifted to the "P" position to lock the shift-lever locking apparatus 10 as described above, the lock lever 27 is moved in the direction of the arrow head D by means of the control wire 19 and is thus located in a second position as shown in FIGS. 6 and 7. In the second position, the lateral extension 28 is located outside the locus of rotation of the lock portion 25 and, therefore, the rotation of the lock portion 25 and hence the rotation of the key rotor 20B in the direction opposite to the arrow head C are allowed. When the key rotor 20B is rotated to the "LOCK" position, the left-hand surface of the lock portion 25 opposes the right-hand surface of the lateral extension 28 to inhibit the lock lever 27 from moving in the direction opposite to the arrow head D.

The operation of the shift-lever locking apparatus 10 having the above-described arrangement and construction will be described below. If the shift lever 1 is, as shown in FIG. 2, located in any one of the positions other than the "P" position, for example, the "N" position, the shift-lever locking apparatus 10 is unlocked and rotary operation of the shift lever 1 is enabled. Since, in this state, the arm 18 of the lever member 15 is rotated in the direction opposite to the arrow head B, the lock lever 27 is pulled in the direction opposite to the arrow head D as shown in FIGS. 1 and 5 and is thereby located in the first position. In this state, the key rotor 20B can be rotated between the "ACC" position and the "START" position. However, since the lateral extension 28 of the lock lever 27 is located in the locus of rotation of the lock portion 25, the rotation of the key rotor 20B (see FIG. 4) from the "ACC" position in the direction opposite to the arrow head C is inhibited by the lateral extension 28 and, therefore, the key rotor 20B cannot be rotated to the "LOCK" position. Accordingly, in a state wherein the shift lever 1 is located in any one of the positions other than the "P" position, it is impossible to rotate the key rotor 20B to the "LOCK" position and hence to pull the key 22 out of the key rotor 20B.

When, in the state shown in FIG. 2, the shift lever 1 is shifted to the "P" position by rotating it in the direction opposite to the arrow head A while depressing the pushbutton 9, the detent pin 7 engages with the engagement recess 12 formed in the movable member 11. When the depression of the pushbutton 9 is released in this state, the detent pin 7 together with the movable member 11 engages with the lock recess 8 as shown in FIG. 3. Simultaneously, the arm 18 of the lever member 15 is rotated in the direction of the arrow head B. As the arm 18 is rotated, the lock lever 27 is moved from the first position in the direction of the arrow head D by means of the control wire 19 and thus the lock lever 27 is located in the second position. In this state, the lateral extension 28 of the lock lever 27 is located outside the locus of rotation of the lock portion 25, and the rotation of the key rotor 20B in the direction opposite to the arrow C is allowed. Thus, the key rotor 20B can be rotated to the "LOCK" position. When the key rotor 20B is rotated to the "LOCK" position, the key 22 can be pulled out of the key rotor 20B. In the meantime, the frame 32 is moved by the motion of the cam 31 and the steering shaft is locked by the lock bar (not shown) and the left hand surface of the lock portion 25 opposes the lateral extension 28 of the lock lever 27 as shown in FIGS. 6 and 7. In this state, the movement of the lock lever 27 in the direction opposite to the arrow head D is inhibited, and hence the rotation of the lever member 15 of the shift-lever locking apparatus 10 in the direction opposite to the arrow head B is inhibited. Accordingly, even if, in this state, the pushbutton 9 of the shift lever 1 is depressed, the detent pin 7 cannot be disengaged from the lock recess 8 since the downward movement of the detent pin 7 is inhibited. In consequence, the shift lever 1 is non-rotatably locked.

In this state, when the key 22 is inserted into the key rotor 20B to rotate the key rotor 20B in the direction of the arrow head C when it reaches an operating position, the movement of the lock lever 27 in the direction opposite to the arrow head D is allowed. Then when the pushbutton 9 of the shift lever 1 is depressed, the detent pin 7 together with the movable member 11 is moved downwardly and disengaged from the lock recess 8. Thus, it becomes possible to shift the shift lever 1 to another position.

In the above-described embodiment, in a state wherein the shift lever 1 is shifted to any one of the positions other than the "P" position, the lateral extension 28 of the lock lever 27 is located in the locus of rotation of the lock portion 25 and, therefore, the key rotor 20B cannot be rotated to the "LOCK" position. Accordingly, it is possible to prevent a seat occupant from mistakenly pulling the key 22 out of the key rotor 20B during running of the vehicle. Furthermore, when the seat occupant needs to leave the vehicle which has been parked, he always shifts the shift lever 1 to the "P" position, rotates the key rotor 20B to the "LOCK" position, and pulls the key 22 out of the key rotor 20B. Accordingly, he can leave the vehicle after the vehicle has been held in a firmly braked state. In a state wherein the key rotor 20B is located in the "LOCK" position, the movement of the lock lever 27 from the second position to the first position is inhibited by the lock portion 25, and the shift lever 1 is non-rotatably locked in the "P" position by the shift-lever locking apparatus 10. Accordingly, if a driver keeps the key 22 anywhere, it is possible to prevent any third party other than the driver from operating the shift lever 1. In the above-described embodiment, in a state wherein the key rotor 20B is located in the operating position (at an intermediate position between the "ACC" position and the "START" position), the lock portion 25 is kept out of contact with the lateral extension 28 of the lock lever 27. Accordingly, even if the key rotor 20B is rotated in the operating position, abrasion due to sliding contact does not occur between the lock portion 25 and the lateral extension 28. In consequence, the key rotor 20B is smoothly rotated and, in particular in automatic return of the key rotor 20B from the "START" position to the "ON" position during engine start-up, rotation of the key rotor 20B can be made smooth.

In the above-described embodiment, the flange portion 26 is formed on the outer periphery of the shaft 23 so as to oppose the lateral extension 28 of the lock lever 27 when the key rotor 20B is located in the operating position. However, the flange portion 26 may be omitted as occasion demands. In addition, although the above-described embodiment is arranged such that the shift lever 1 is locked in the "P" position by the shift-lever locking apparatus 10, the shift lever 1 may be locked in another non-driving position, that is, the "N" position.

Figure 8:
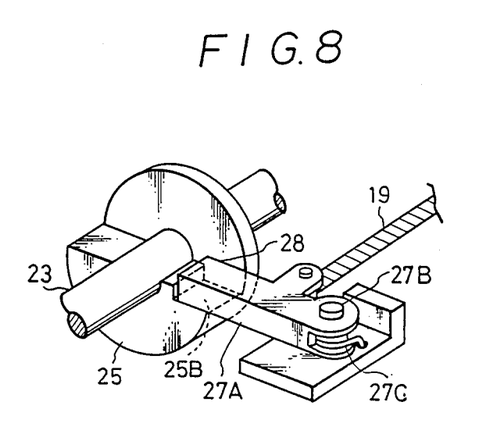
FIG. 8 is a perspective view showing a relationship between a lock lever and a lock portion in a second embodiment corresponding to FIG. 5.

Referring to FIG. 8 which shows a second embodiment of the present invention, a lock lever 27A is supported on the housing 21 by means of a pin 27B and is urged by a torsion coil spring 27C in the direction in which the extension 28 of the lock lever 27A moves out of the locus of rotation of the lock portion 25 and in one direction along the axis of the shaft 23. The control wire or connecting member 19 is connected to an intermediate portion of the lock lever 27B. Accordingly, this embodiment can achieve effects and advantages similar to those of the above-described embodiment.

It is to be noted that the connecting member 19 may be arranged such that when the shift lever 1 is located in the non-driving position, a pulling force acts to move the lock lever 27A out of the locus of rotation of the lock portion 25.

Furthermore, the lock lever 27A may be disposed such that it moves toward and away from the lock portion 25 and the shaft 23 in the radial direction thereof so that the extension 28 can be moved into and away from the locus of rotation of the lock portion 25.

FIGS. 9 to 14 show a third embodiment of the present invention. This embodiment has a construction in which a brake pedal is interlockingly incorporated so as to reduce the operating force required to depress the pushbutton of a shift lever and to release a shift-lever lock.

In this embodiment, a movable member 11A is guided by a guide plate 4A fixed to the detent plate 4 in such a manner that it can move in the direction parallel to the axis which extends between the shaft 3 and the lock recess 8. The movable member 11A is urged by its own weight in the downward direction that is, in the direction in which it approaches the shaft 3. An engagement step 113 is formed in one side of the movable member 11A so that a lower portion of the engagement step 113 is reduced in width.

Figure 10:
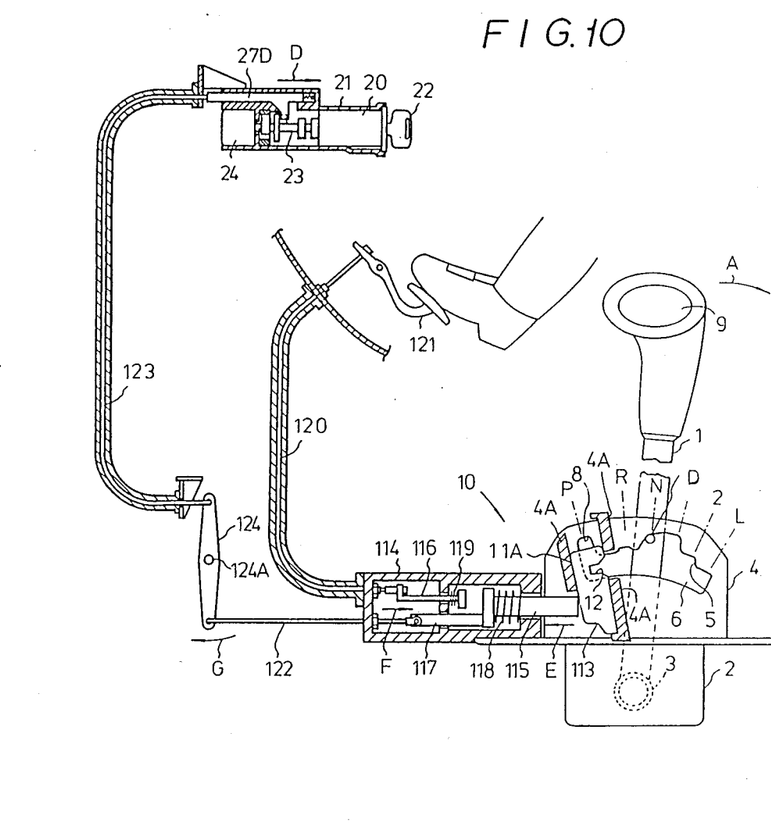
FIG. 10 is a schematic view including a shift lever of the third embodiment corresponding to FIG. 2.

A holder 114 is fixed to the frame 2 on the left-hand side of the detent plate 4 as viewed in FIG. 10. A stopper member 115 is slidably supported by one end of the holder 114, and one end of the stopper member 115 projects toward the movable member 11A. A first actuator 116 and a second actuator 117 are slidably supported in the holder 114 and one end of each of the first and second actuators 116 and 117 is opposed to the other end of the stopper member 115. The stopper member 115 is urged in the direction indicated by an arrow head E by a coil spring 118, while the first actuator 116 is urged by a coil spring 119 so as to approach the stopper member 115 in the direction indicated by an arrow head F.

Figure 11:
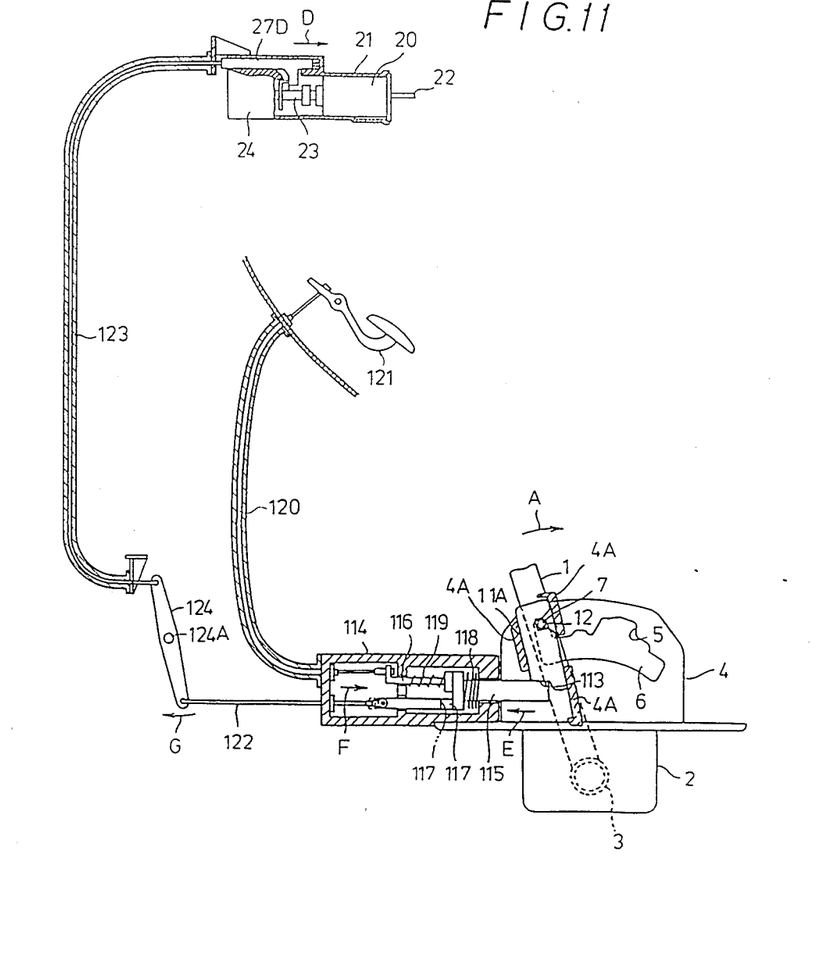
FIG. 11 is an operational view of the third embodiment shown in FIG. 10.

The spring force of the coil spring 119 is selected to be sufficiently greater than that of the coil spring 118. The first actuator 116 is connected to the brake pedal 121 of a foot brake by means of a control wire 120. Accordingly, when the brake pedal 121 is applied, the first actuator 116 is, as shown in FIG. 10, moved in the direction opposite to the arrow head F against the urging force of the coil spring 119. When the application of the brake pedal 121 is released, the first actuator 116 is, as shown in FIG. 11, moved in the direction of the arrow head F by the urging force of the coil spring 119. The second actuator 117 is connected to a lock lever 27D by connecting wires 122 and 123 as well as a link 124. When the lock lever 27D is moved in the direction opposite to the arrow head D, the link 124 is rotated about a shaft 124A in the direction indicated by an arrow head G and, therefore, the second actuator 117 is, as shown in FIG. 10, moved in the direction opposite to an arrow head F. When the lock lever 27D is moved in the direction indicated by the arrow head D, the second actuator 117 is moved in the direction of the arrow head F as shown in FIG. 11.

Figure 9:
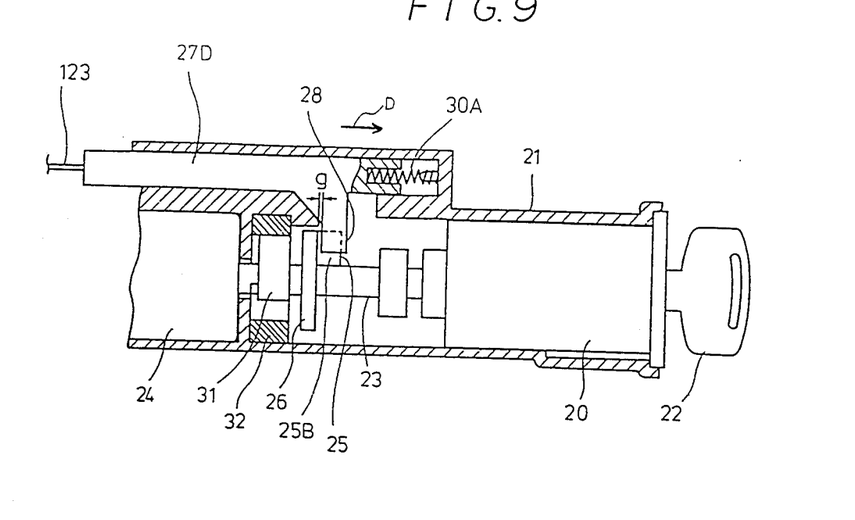
FIG. 9 is a cross-sectional view of an ignition key apparatus of a third embodiment corresponding to FIG. 1.
Figure 12:
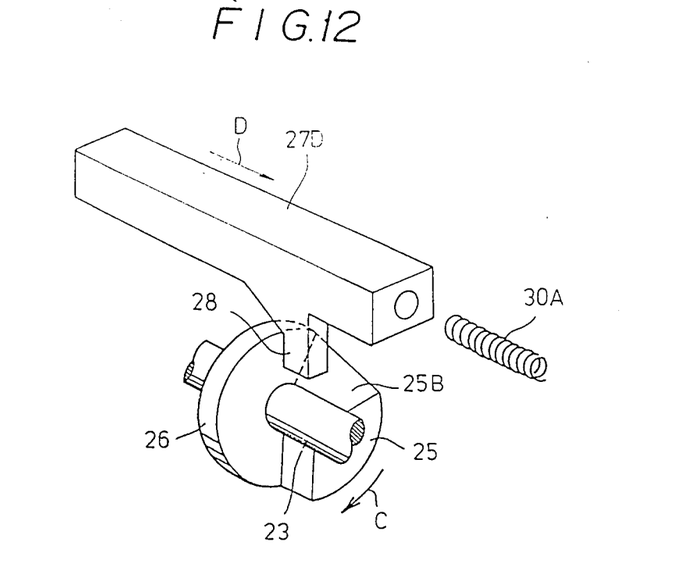
FIG. 12 is a perspective view showing a relationship between a lock lever and a lock portion in the third embodiment.

As shown in FIG. 12, the lock portion 25 fixed to an intermediate portion of the key rotor shaft 23 has an inclined surface 25B formed on either of the circumferential sides, and the lock portion 25 is formed such that the cross-sectional area thereof progressively increases in the axial direction toward the facing flat surface of the flange portion 26. The lock lever 27D is urged by a spring 30A in the direction in which the extension 28 approaches the flange portion 26 that is, in the direction opposite to the arrow D. In the state shown in FIGS. 9 and 12 in which the lock lever 27D is biased in the direction opposite to the arrow head D by the urging force of the spring 30A, the extension 28 of the lock lever 27D is opposed to the corresponding surface of the flange portion 26 with a predetermined gap "g" formed therebetween as shown in FIG. 9. When, in this state, the key rotor 20B is rotated in the direction opposite to the arrow head C (see FIG. 4), the extension 28 slides over the inclined surface 25B of the lock member 25 and engages with the lock portion 25. Thus, the lock lever 27D is moved in the direction of the arrow head D against the spring 30A as shown in FIGS. 13 and 14.

The operation of the arrangement described above is described hereinbelow. As shown in FIG. 10, when the shift lever 1 is located in any one of the positions other than the "P" position, for instance, the "N" position, then when the key rotor 20B is located in the operating position, and when the brake pedal 121 of the foot brake is put on, the movable member 11A is biased to its lower position by its own weight. In the meantime, the first actuator 116 and the second actuator 117 are respectively biased in the direction opposite to that indicated by the arrow head F, and the stopper member 115 is biased in the direction of the arrow head E by the urging force of the coil spring 118. In this state, the shift lever 1 can be freely operated. When, in this state, the shift lever 1 is shifted to the "P" position by rotating it in the direction opposite to the arrow head A while depressing the pushbutton 9, the detent pin 7 engages with the engagement recess 12 formed in the movable member 11A. When the depression of the pushbutton 9 is released, the detent pin 7 is moved upwardly and engages with the lock recess 8. In the meantime, the movable member 11A is, as shown in FIG. 11, moved upwardly and placed in a lock position. In this state, when the key rotor 20B is rotated from the operating position toward the "LOCK" position in the direction opposite to the arrow head C by means of the key 22, the inclined surface 25B comes into contact with the extension 28 of the lock lever 27D at a position at which the key rotor 20B moves beyond the "ACC" position which is the end of the operating position. The lock lever 27D is moved in the direction of the arrow head D against the spring 30A while the projection 28 is sliding over the inclined surface 25B. Accordingly, when the connecting wires 123 and 122 are driven and thus the key rotor 20B is rotated to the "LOCK" position, the projection 28 of the lock lever 27D, as shown in FIGS. 13 and 14, moves beyond the inclined surface 25B and runs onto the lock portion 25. As the lock lever 27D moves in the direction of the arrow head D, the link 124 is rotated in the direction opposite to an arrow head G and the second actuator 117 is moved in the direction of the arrow head F from the position shown in FIG. 10, and is located in a holding position shown in solid lines. Thus, the stopper member 115 is moved in the direction of the arrow head E against the coil spring 118 to engage with the engagement step 113 of the movable member 11A. The movable member 11A is held in a lock position by the stopper member 115 when the key rotor 20B is located in the "LOCK" position in this manner, the key 22 can be pulled out. In this state, when the application of the brake pedal 121 is released, the first actuator 116 is moved in the direction of the arrow head F by the urging force of the coil spring 119 and is located in the holding position as shown in FIG. 11. In this state, since the downward movement of the detent pin 7 is inhibited, even though the pushbutton 9 is depressed, the detent pin 7 cannot be disengaged from the lock recess 8 and the shift-lever locking apparatus 10 is locked. Thus, the shift lever 1 is non-rotatably locked in the "P" position.

Figure 13:
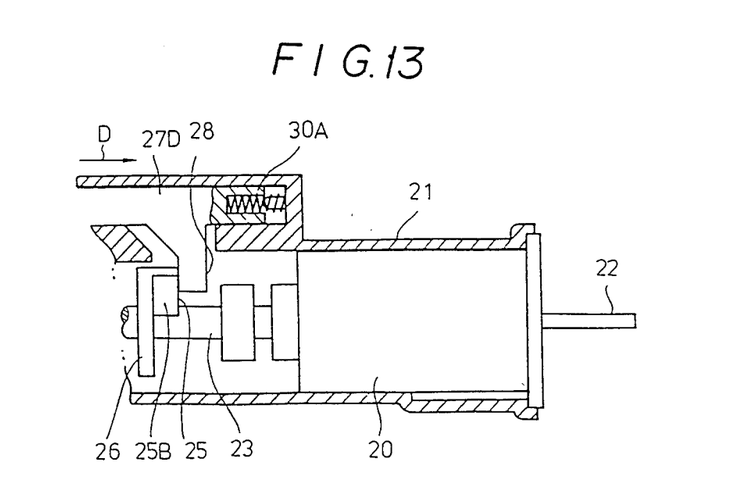
FIG. 13 is a cross-sectional view showing an operation of the ignition key apparatus shown in FIG. 9.
Figure 14:
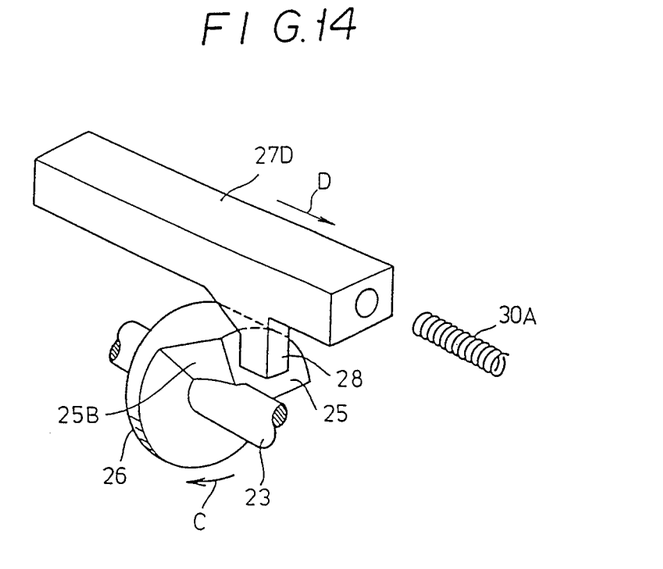
FIG. 14 is a perspective view showing an operation between the lock lever and a lock portion shown in FIG. 12.

In the state shown in FIG. 13, when the key rotor 20B is rotated from the "LOCK" position to the operating position by rotating the key 22, the extension 28 of the lock lever 27D which has been engaged with the lock portion 25 is disengaged therefrom and thus the lock lever 27D is returned in the direction opposite to the arrow head D by the urging force of the spring 30A. As the lock lever 27D moves, the link 124 is rotated in the direction of the arrow head G, and thus the second actuator 117 is moved in the direction opposite to the arrow head F and is located in the release position shown in FIG. 10. When the brake pedal 121 is depressed, the first actuator 116 is moved against the coil spring 119 in the direction opposite to the arrow head F and is located in the release position shown in FIG. 10. When the two conditions that the key rotor 20B is located in the operating position and that the brake pedal 121 is applied are satisfied, the stopper member 115 is, as shown in FIG. 10, moved in the direction of the arrow head E by the urging force of the coil spring 118 in interlocked relationship with the movements of the first and second actuators 116 and 117. In consequence, the stopper member 115 is disengaged from the engagement step 113 of the movable member 11A and therefore the downward movement of the movable member 11A is allowed. In this fashion, the shift-lever locking apparatus 10 is unlocked. When, in this state, the pushbutton 9 is depressed, the detent pin 7 and the movable member 11A are moved downwardly and the detent pin 7 is disengaged from the lock recess 8. It is, therefore, possible to shift the shift lever 1 from the "P" position to another position. When the movable member 11A is moved to its lower position as shown in FIG. 10, one end of the stopper member 115 is brought into contact with the left-hand edge of the movable member 11A and the movement of the stopper member 115 in the direction opposite to the arrow head E is inhibited, and hence the movement of the lock lever 27D in the direction of the arrow head D is inhibited. Accordingly, the extension 28 of the lock lever 27D is located in the locus of rotation of the lock portion 25, and the inclined surface 25B of the lock portion 25 is kept in contact with the extension 28 of the lock lever 27D to inhibit the rotation of the lock portion 25 in the direction opposite to the arrow head C. Accordingly, even when the key rotor 20B is to be rotated from the operating position to the "LOCK" position, the key rotor 20B cannot be rotated to the "LOCK" position, and hence the key 22 cannot be pulled out of the key rotor 20.

In the above-described embodiment, even when the key rotor 20B is rotated to the operating position and the engine is started, the shift lever 1 cannot be shifted from the "P" position to another position as long as the brake pedal 121 of the foot brake is not applied. Accordingly, it is possible to prevent the occurrence that a vehicle is reversed contrary to the intention of a driver owing to the fact that the brake pedal 121 is not depressed at the "R" position which the shift lever 1 will pass in the course of shifting from the "P" position to, for example, the "D" position.

In the above-described embodiment, when the key rotor 20B is rotated from the "ACC" position to the "LOCK" position, the lock lever 27D moves in parallel with the shaft 23 by virtue of the inclined surface 25B of the lock portion 25 to drive the connecting wires 123 and 122, thereby operating the second actuator 117 and the stopper member 115. Thus, the detent pin 7 is held in a locked state by the movable member 11A. While the detent pin 7 is moving from the locked state to the unlocked state, the movable member 11A also moves downwardly by its own weight with the downward movement of the detent pin 7. Accordingly, a depression load applied to the pushbutton 9 does not increase. In contrast, when an operating cable is to be driven by the downward movement force of the control pin by means of the bell crank, as in the conventional example, the operating load applied to the pushbutton 9 of the shift lever 1 may reach 1.5 to 2 times the operating load applied to the same in any one of the positions other than the "P" position. For this reason, a large force is required to depress the pushbutton 9 in the "P" position, and therefore some people who have weak force may think that the pushbutton 9 can not be operated in the "P" position.

In the third embodiment, however, if the operating force required to rotate the key rotor 28 from the "ON" position to the "START" position is represented by T [kg·cm], the key rotor 28 can be rotated from the "ACC" position to the "LOCK" position with an operating force of 0.4–0.6 T [kg·cm]. Accordingly, the key rotor 20B is rotated from the "ACC" position to the "LOCK" position to drive the connecting wires 123 and 122 with an operating force smaller than that required during engine start-up. Accordingly, an operator can operate the key rotor 20B without having an unpleasant feeling due to an increase in operating force.

It is to be noted that, although the flange portion 26A is provided in the vicinity of the lock portion 25 in each of the above-described embodiments, the flange portion may be formed as occasion demands.

What is claimed is:

1. A locking apparatus for a shift lever provided for operating an automatic transmission of a vehicle to allow an operation of said shift lever under particular conditions, comprising:
   (a) a key rotor rotatable between a lock position and an operating position for running said vehicle by a key operation performed by a seat occupant;
   (b) a shift lever shiftable between a driving position for placing said automatic transmission in a vehicle driving state and a non-driving position for placing said automatic transmission in a vehicle non-driving state by said occupant;
   (c) detent means disposed on said shift lever for movement between an inhibiting position and a releasing position, said detent means being moved to said inhibiting position to inhibit the shifting of said shift lever from said non-driving position to said driving position at times when said shift lever is shifted from said driving position to said non-driving position, and said detent means permitting the shifting of said shift lever to said driving position at times when said detent means is moved from said inhibiting position to said releasing position under the operation of said seat occupant;
   (d) a lock member rotatable coaxially with said key rotor and operated by the rotary operation of said key rotor; and
   (e) interlocking means interposed between said detent means on said shift lever and said lock member, and having one end disposed adjacent to said lock member for movement in a direction parallel to a longitudinal axis of said key rotor, said interlocking means being placed in a first state wherein said one end projects into a locus of movement of said lock member to restrict a range of movement of said lock member at times when said shift lever is shifted to said driving position, inhibiting said key rotor from rotating to said lock position, and the projection of said one end into the locus of movement of said lock member being inhibited at times when said key rotor is located in said lock position, said interlocking means being maintained in a second state until said key rotor is moved to said operating position where said detent means is held in said inhibiting position for preventing said shift lever from being moved to said driving position at times when said shift lever is shifted to said non-driving position, whereby said shift lever is held in said non-driving position when a key is in said lock position whereas the rotation of said key to said lock position is inhibited in said driving position of said shift lever.

2. An apparatus according to claim 1, wherein said lock member projects radially from the axis of rotation of a shaft which is rotated together with said key rotor.

3. An apparatus according to claim 1, wherein when said shift lever is shifted to said non-driving position to cause said detent means to move to said inhibiting position, said interlocking means comes away from the locus of movement of said lock member by virtue of a driving force derived from the movement of said detent means.

4. An apparatus according to claim 1, wherein said interlocking means is urged in a direction wherein said one end of said interlocking means comes away from the locus of movement of said lock member.

5. An apparatus according to claim 1, wherein said interlocking means has a detent means controlling member which is disposed in said non-driving position of said shift lever so as to engage with said detent means when said shift lever has been shifted to said non-driving position.

6. An apparatus according to claim 1, wherein said interlocking means has an intermediate portion constituted by a wire cable, one end of said wire cable being connected to a lock lever which moves into and out of the locus of movement of said lock member.

7. An apparatus according to claim 1, wherein when said key rotor is rotated from said lock position to said operating position and when a brake pedal of said vehicle is applied, said interlocking means enables said detent means to move from said inhibiting position to said releasing position.

8. An apparatus according to claim 7, further including a detent means controlling member disposed in correspondence with said non-driving position of said shift lever and freely movable between said inhibiting position and said releasing position, said detent means controlling member being arranged to engage with said detent means and engagedly moved with said detent means to said inhibiting position thereby allowing said key rotor to locate in said operating position when said shift lever has moved to said non-driving position, while only when said brake pedal is applied, said detent means controlling member can be moved from said inhibiting position to said releasing position.

9. An apparatus according to claim 8 further including a stopper member allowing said detent means controlling member to be moved from said inhibiting position to said releasing position only when said key rotor is placed in said operating position and when said brake pedal is applied.

10. An apparatus according to claim 9, wherein said stopper member and said detent means controlling member respectively have engagement portions which engage with each other at said inhibiting position of said detent means so as to inhibit said detent means from moving to said releasing position.

11. An apparatus according to claim 10 further including urging means for urging said stopper member in the direction away from said detent means controlling member.

12. An apparatus according to claim 11, further including a first actuator coupled to the brake of said vehicle whereby, at times when said brake pedal is not applied, said first actuator presses said stopper member in the direction in which said stopper member holds said detent means controlling member in said inhibiting position, and at times when said brake pedal is applied, said first actuator moves away from said stopper member.

13. An apparatus according to claim 12, further including a second actuator disposed in correspondence with said stopper member, said second actuator pressing said stopper member in the direction in which said stopper member holds said detent means controlling member in said inhibiting position, when said key rotor is located in said operating position, said second actuator moves away from said stopper member when said key rotor is rotated to said lock position.

14. A locking apparatus for use with a shift lever, comprising:
a key rotor rotatably disposed in a housing and arranged such that a key is able to be inserted into and pulled out of said key rotor at a lock position, the pulling of said key being prevented when rotating said key rotor from said lock position to an operating position under the rotary operation of said key;
a shift lever arranged to enable selection of any one of a plurality of positions under a rotary operation of said shift lever;
lever locking means arranged to be in a locked state for non-rotatably locking said shift lever when shifting said shift lever to a particular non-driving position, and arranged to be in an unlocked state except when shifting said shift lever to said particular non-driving position;
a shaft disposed in said housing and arranged to be rotatable integrally with said key rotor;
a lock portion formed to project from the shaft in the radial direction; and
an extension coupled to said lever locking means by a coupling member and disposed to project toward said shaft, said extension being arranged to move in the axial direction of said shaft, moving into and away from the locus of movement of said lock portion;
whereby, at times when said lever locking means is unlocked and is moved to a first position, said extension is located in said locus of rotation of said lock portion to inhibit said key rotor from rotating from said operating position to said lock position; when said lever locking means is locked and said lock lever is moved to a second position, said extension is located out of said locus of rotation of said lock portion to allow the rotation of said key rotor from said operating position to said lock position; and when said key rotor is rotated to said lock position, one side of said key rotor is rotated to said lock position, one side of said lock portion being located in opposition to said extension to inhibit the movement of said lock lever from said second position to said first position so that said lever locking means is locked.

15. A locking apparatus according to claim 14, wherein said extension is urged in the direction in which said extention is moved along the axis of said shaft and inserted into the locus of movement of said lock portion.

16. A locking apparatus according to claim 15, wherein said shift lever is provided with detent means which is arranged to inhibit said shift lever from moving from said non-driving position to another position when said shift lever is located in said non-driving position, said detent means being controlled by said lever locking means.

17. An apparatus according to claim 16, wherein said lever locking means is provided with a detent means controlling member arranged to engage with said detent means when said shift lever is shifted to said non-driving position, said detent means controlling member constituting a part of said lever locking means.

18. An apparatus according to claim 14, wherein said extension is forcibly moved in one direction against the force of a spring by means of an inclined surface formed on said key rotor at times when said key rotor is rotated from the operating position to the lock position.

19. An apparatus according to claim 18, wherein said key rotor has a flange portion provided around said shaft and adjacent to said lock portion, said extension being spaced apart from said flange portion by a predetermined gap under the urging force of said spring.

20. A locking apparatus for a shift lever comprising:
a key rotor rotatably disposed in a housing and arranged such that a key is able to be inserted into and pulled out of said key rotor at a lock position, the pulling of said key being prevented at times when said key rotor has been rotated from said lock position to an operating position under the rotary operation of said key;
a shift lever arranged to enable selection of any one among a plurality of positions under a rotary operation of said shift lever;
lever locking means arranged to be in a locked state for non-rotatably locking said shift lever when shifting said shift lever to a particular non-driving position, and arranged to be in an unlocked state except when shifting said shift lever to said particular non-driving position;
a shaft disposed in said housing and arranged to be rotatable with said key rotor;
a lock portion formed to project from the shaft in the radial direction; and
an extension coupled to said lever locking means by a coupling member and disposed to project toward said shaft, said extension being arranged to move in the axial direction of said shaft, moving into and away from the locus of movement of said lock portion;
whereby, at times when said lever locking means is unlocked and is moved to a first position, said extension is located in said locus of rotation of said lock portion to inhibit the rotation of said key rotor from said operating position to said lock position; at times when said lever locking means is locked and said lock lever is moved to a second position, said extension is located out of said locus of rotation of said lock portion to allow the rotation of said key rotor from said operating to said lock position; and at times when said key rotor is rotated to said lock position, one side of said lock portion is located in opposition to said extension to inhibit the movement of said lock lever from said second position to said first position so that said lever locking means is locked.

* * * * *